UNITED STATES PATENT OFFICE 2,104,728

WETTING AND DISPERSING AGENTS AND PROCESS OF MAKING THE SAME

Heinrich Bertsch and Hans Stober, Chemnitz, Germany, assignors, by mesne assignments, to Böhme Fettchemie-Gesellschaft mit beschrankter Haftung, Chemnitz, Germany No Drawing. Application August 1, 1933, Serial No. 683,228. In Austria March 9, 1933

8 Claims. (Cl. 260—41)

This invention relates to agents for increasing the capillary activity of liquids and to processes for manufacturing such agents. It is the principal object of the invention to produce agents of this character exhibiting an extremely low surface tension and absolute stability in the presence of alkalis or concentrated acids and to salts of various kinds, including the heavy metal salts. It is a feature of the invention that these agents are capable of forming positively charged surface active ions whereby their presence in an alkaline solution effects discharge of any negatively charged emulsion or turbid mixture for the purpose of establishing a flocculent condition.

A more specific object of the invention is the provision of agents of this character comprising quarternary ammonium compounds and a process of making these compounds comprising the reaction of secondary or tertiary heterocyclic amines with alkyl mono-sulphuric acid esters or their salts. Alternatively, in lieu of the alkyl sulphuric acids, the formation components of these compounds may be used, for instance the mixtures of the aliphatic alcohols with sulphonating or sulphating agents such as sulphuric acid, sulphur trioxide, or halogen sulphonic acids.

It is found that those quaternary ammonium salts having a molecular weight of not less than 200 are particularly suited for the various uses to which the agents contemplated by the present invention may be put, and the molecular weight of the agents may of course be controlled by suitable selection of the initial materials. Thus if a heterocyclic tertiary amine having a molecular weight of less than 120 is employed as a starting material, a sulphuric acid ester with at least eight carbon atoms should be selected; if an amine of higher molecular weight is employed, low molecular sulphuric acid esters or their salts may be used.

The conversion of the heterocyclic secondary or tertiary amines by the alkyl sulphuric acids or their salts is best effected at elevated temperatures, and under some circumstances increased pressures must be applied during the reaction, particularly in the case of the higher molecular compounds. Thus satisfactory results have been obtained with various materials by the employment of a range of temperatures of from 130° C. to 210° C. and a range of pressures from 2 to 10 atmospheres, it being understood that the temperature and pressure employed may be altered to suit the requirements of the materials undergoing reaction.

The desired reaction may be secured by proceeding in accordance with the following examples, it being understood that these examples are merely illustrative and that the conditions and materials employed may be varied to a considerable extent.

Example I

Into 100 parts by weight of pyridine are stirred 30 parts by weight of chlorsulphonic acid at temperatures between 0° and 10° C. 40 parts by weight of lauric alcohol are then introduced at a temperature of 30° C. and the crude mixture is heated in an autoclave for some hours at 150° C.

The mixture is then cooled, and slight amounts of pyridine which have not taken part in the reaction are removed by washing with ethyl ether or by distilling in a vacuum. The resulting product is a substance soluble in water, yellow in color, and crumbling in structure. If desired this product may be used in powdered form by dissolving the same in water and drying, for instance in an atomizing drier. The reaction can also be carried out in the presence of solvents, for example hydrocarbons and other inert organic liquids, such as benzine, benzol, hexane.

The reaction can be illustrated by the following formula:

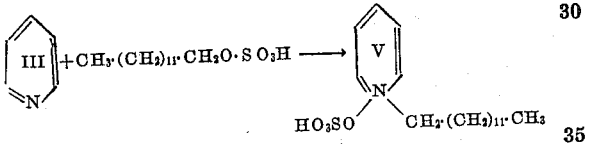

Example II 24 parts by weight of chloro-sulphonic acid are poured while stirring into 40 parts by weight of higher pyridine homologues at temperatures between 0 and +10° C. Then 55 parts by weight of octadecenol are added at a temperature of 40° and the reaction-product is heated for some hours up to 160° in the autoclave. After cooling the small excess of pyridine is taken off by washing with ether or distillation in vacuo. The reaction-product is easily soluble in water, of brown colour and of paste-like consistence at ordinary temperatures.

We can work also in presence of a higher excess of pyridine-bases, f. i. 100 parts; a somewhat higher yield is then obtained.

Example III 30 parts by weight of chloro-sulphonic acid are poured while stirring into 56 parts by weight of pyridine at temperatures between 0 and +10° C. Then 50 parts by weight of hexadecanol are added at temperatures between 40 and 50°, and the reaction-product is heated up to 180° for several hours in the autoclave. After cooling the excess of pyridine is taken off by washing with ether and by distillation in vacuo. The reaction-product can be easily cleaned to a high degree by recrystallization with the help of organic solvents. It is easily soluble in water, in pure condition perfectly white and melts at about 85° C.

*Example IV*

30 parts by weight of chloro-sulphonic acid are poured while stirring into 40 parts by weight of pyridine. Then a solution of 54 parts by weight of octadecanol is added to 60 parts by weight of pyridine at a temperature of 45 to 55° and the reaction-product is heated for some hours up to 190°. After cooling the excess of pyridine is taken off by washing with ether or distillation in vacuo. The reaction-product can be easily obtained in pure condition by recrystallizing with the help of organic solvents. It is easily soluble in water, in pure condition perfectly white and melts at about 107°.

*Example V*

38 parts by weight of lauric alcohol are sulphonated with 24 parts by weight of chlorosulphonic acid at a temperature of 40° C. 70 parts by weight of pyridine are added at the same temperature. The reaction-product is then heated for several hours up to 150° in the autoclave. After cooling the excess of pyridine is taken off by washing with ether or distillation in vacuo. The reaction-product is soluble in water, of yellow color and of crumbling structure.

*Example VI*

30 parts by weight of the sodium salt of lauric alcohol sulphuric acid ester are thoroughly mixed with 8 parts by weight of pyridine and heated for several hours up to 165° in the autoclave. After cooling, the reaction-product is washed with ether in order to remove the small quantities of products of decomposition, and the reaction-product is cleaned by recrystallizing with the help of organic solvents. It is not soluble in water, as the reaction has gone one step farther than in the preceding examples. The reaction is demonstrated by the following formulae:

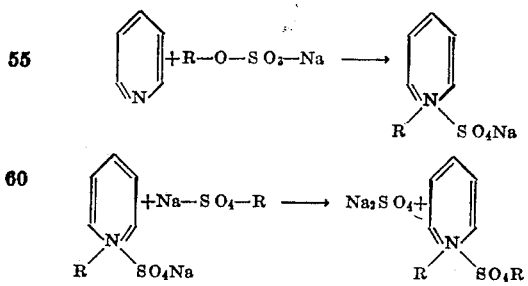

This product is of pure, white colour too and melts at 90° C.

*Example VII*

129 parts by weight of quinoline are added to 30 parts by weight of chloro-sulphonic acid at temperatures up to +20° C. Then 40 parts by weight of technical lauric alcohol are added to the reaction-mixture while stirring, until a complete solution has taken place. This solution is heated in the autoclave at temperatures from 140 to 160° C. for some hours. The excess of quinoline is now removed either by cautious distillation under reduced pressure or by washing with an organic solvent, such as ether, petrol ether or similar ones. The dark-red remainder is of syrup-like consistence and soluble in water and acids, and these solutions show foaming properties.

It will be appreciated that the processes described in the foregoing examples can be applied to the reaction of other secondary and tertiary amines and other esters and salts than those mentioned. Among the preferred amines may be mentioned the following: methyl-pyridines, di-methyl-pyridines, methylquinoline, n-methyl-piperidine, iso-quinoline, nicotine.

Similarly the alcohols and their derivatives may be varied as desired, the following additional alcohols being suggested: octadecan-diol, hexadecenol, undecenol, decanol, tetradecanol, ricinoleic alcohol.

The compounds produced in accordance with the present invention exhibit a marked diminution, even in an extremely dilute aqueous solution, in the surface tension between the solution and air or between the solution and solid bodies immersed therein. By reason of the unique property exhibited by these agents of forming positively charged surface active ions, negative charged emulsions or turbid mixtures are readily brought to a flocculent condition without affecting the alkalinity of the aqueous phase and the agents themselves cause no precipitation, so that the resulting sediment consists only of emulsified or dispersed particles. Alternatively, the quaternary ammonium salts may be used as protective colloids or emulgators or peptizators for all positively charged substances, or as coagulators for all negatively charged substances, independent of the pH value. Thus these salts are suitable for the following practical applications:

1. For flotation as positive charging "collectors" and "foam formers" as well as combined "collector-foam formers."

2. For purification of waste waters in all instances in which the impurities are negatively charged, for example in the case of waste waters of dye plants, wood pulp, cellulose, and paper making plants, slaughter houses, sugar mills, municipal sewage plants, in the working of coal or charcoal, and for clarification of mineral suspensions.

3. For making positively charged emulsions and for destroying negatively charged emulsions, even in cases of very high alkalinity.

4. For batting cotton for the purpose of subsequent dyeing with basic dyestuffs, and as a substitute for metal oxide mordants or for mixing with such materials.

5. For addition to mineral and vegetable tanning liquors as well as in leather fatting and leather dyeing.

6. For fixing water-proof impregnations.

7. In the manufacture of agents for combating pests, particularly such agents as contain heavy metal salts.

8. For the subsequent treatment of developing fluids not proof against friction, for example indanthrene and naphthol dyes.

Having thus described the invention, what is claimed as new and desired to be secured by Letters Patent is:

1. The process of producing a high molecular quaternary ammonium salt which comprises reacting pyridine and the sulphuric acid ester of lauric alcohol at a temperature not less than 130° C.

2. The process of producing a high molecular quaternary ammonium salt which comprises reacting quinoline and the sulphuric acid ester of decanol at a temperature not less than 130° C.

3. A quaternary ammonium salt of the general formula RXSO₄H, wherein "R" is an aliphatic hydrocarbon radical, containing at least eight carbon atoms, and "X" is the nitrogen atom in a pyridine or quinoline ring structure.

4. The process of making high molecular quaternary ammonium salts which comprises reacting a compound selected from the group consisting of pyridine, chinoline, iso-chinoline, N-alkyl piperidines, and the homologues of said compounds, and nicotin, with compounds selected from the group consisting of alkyl mono-sulphuric acid esters and the salts of such esters having at least eight carbon atoms at a temperature not less than 130° C.

5. The process of making high molecular quaternary ammonium salts which comprises reacting a compound selected from the group consisting of pyridine, chinoline, iso-chinoline, N-alkyl piperidines, and the homologues of said compounds, and nicotin, with an aliphatic alcohol and a sulphating agent at a temperature not less than 130° C.

6. The process of making high molecular quaternary ammonium salts which comprises mixing compounds selected from the group consisting of pyridine, chinoline, iso-chinoline, N-alkyl piperidines, and the homologues of said compounds, and nicotin, with compounds selected from the group consisting of alkyl mono-sulphuric acid esters and the salts of such esters, and heating the mixture to a temperature of from about 130° C. to about 210° C.

7. A quaternary ammonium salt derived from pyridine and having the general formula

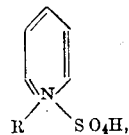

wherein "R" is an aliphatic hydrocarbon radical, containing twelve carbon atoms.

8. A quaternary ammonium salt derived from quinoline and having the general formula

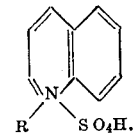

wherein "R" is an aliphatic hydrocarbon radical, containing twelve carbon atoms.

HEINRICH BERTSCH.
HANS STOBER.